United States Patent [19]

Yamagishi et al.

[11] Patent Number: 5,088,646
[45] Date of Patent: Feb. 18, 1992

[54] HEAT PUMP TYPE HEATING APPARATUS AND CONTROL METHOD THEREOF

[75] Inventors: Katsuaki Yamagishi; Koji Kashima, both of Yokohama; Toru Kubo, Fuji, all of Japan

[73] Assignee: Kabushiki Kaisha Toshiba, Kawasaki, Japan

[21] Appl. No.: 621,870

[22] Filed: Dec. 4, 1990

[30] Foreign Application Priority Data

Dec. 6, 1989 [JP] Japan .................. 1-315154
Jan. 23, 1990 [JP] Japan .................. 2-11905

[51] Int. Cl.$^5$ ............................ G05D 23/00
[52] U.S. Cl. ........................ 237/2 B; 237/69
[58] Field of Search .......... 237/2 B, 69; 62/238.6, 62/324.1, 235.1, 324.6

[56] References Cited

U.S. PATENT DOCUMENTS 4,575,001  3/1986  Oskarsson et al. ............ 237/2 B
4,722,197  2/1988  McEntire ................. 237/2 B X

FOREIGN PATENT DOCUMENTS 61-145244  9/1986  Japan .
2067275    7/1981  United Kingdom .

OTHER PUBLICATIONS

Minami Kazunari, "Air Conditioner with Floor Heating Function", Patents Abstracts of Japan, Mar. 10, 1987, vol. 011, No. 078 (M-570).
Yamaguchi Koichiro, "Heat Pump Heater", Patent Abstracts of Japan, Sep. 12, 1985, vol. 9, No. 226 (M-412).

Primary Examiner—Henry A. Bennet
Attorney, Agent, or Firm—Cushman Darby & Cushman

[57] ABSTRACT

A refrigeration cycle constitutes a closed cycle for circulating a refrigerant therein and includes at least a variable capacity compressor, an outdoor heat exchanger, an expansion valve, and an indoor heat exchanger. The indoor heat exchanger is provided with temperature sensor and an indoor fan. A floor heating panel is connected in parallel with the indoor heat exchanger. The panel is provided with a floor temperature sensor. A flow control valve is arranged in a refrigerant upstream side of the panel at a heating operation. A controller controls the compressor, the fan, and the valve in a first state at the start of a heating operation to simultaneously start air heating by the indoor heat exchanger and floor heating by the panel. The compressor, the fan, and the valve are controlled in a second state when a detection output from the room temperature sensor reaches a preset value, thereby maintaining a room temperature and increasing a floor temperature. At least one of the compressor and the valve are controlled in a third state when a detection output from the floor temperature sensor reaches a preset value, thereby maintaining the floor temperature. At least one of the compressor and the fan are controlled in a fourth state, thereby controlling the room temperature to a predetermined value.

15 Claims, 15 Drawing Sheets

|   | M₁ | M₂ | M₃ | M₄ | INVERTER | INDOOR FAN |
|---|---|---|---|---|---|---|
| ① | CON-TROLLED | OPEN | OPEN | OPEN | HIGH | HIGH |
| ② | CON-TROLLED | OPEN | OPEN | OPEN | HIGH OR CON-TROLLED | HIGH OR CON-TROLLED |
| ③ | CON-TROLLED | OPEN | OPEN | OPEN | CON-TROLLED | CON-TROLLED OR OFF |

FIG. 2

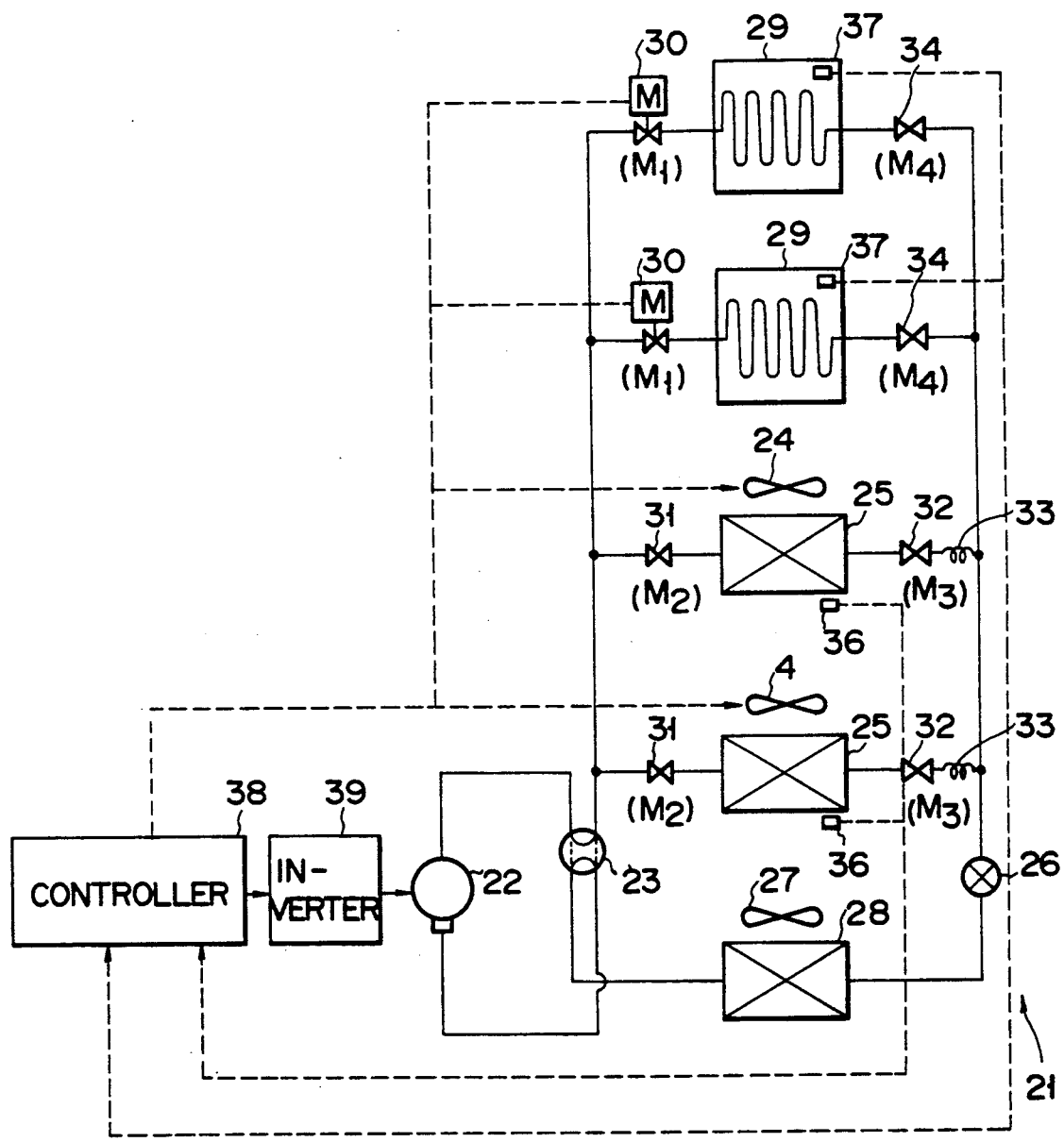
F I G. 6

|   | M₁ | M₂ | INVERTER 37 | INDOOR FAN 24 |
|---|---|---|---|---|
| ① | OPEN | OPEN | HIGH | HIGH |
| ② | OPEN | OPEN | HIGH OR CONTROLLED | CONTROLLED |
| ③ | OPEN | OPEN | CONTROLLED | CONTROLLED OR OFF |

FIG. 9

| | VALVE 12 | INVERTER HZ | INDOOR FAN |
|---|---|---|---|
| ① | CLOSED | HIGH | HIGH |
| ② | CLOSED | HIGH | ON-OFF |
| ③ | CLOSED | CONTROLLED | OFF |

HEAT PUMP TYPE HEATING APPARATUS AND CONTROL METHOD THEREOF

BACKGROUND OF THE INVENTION

1. Field of the Invention

The present invention generally relates to a heat pump type air conditioner system and, more particularly, a heat pump type heating apparatus and a control method thereof, capable of performing both air heating and floor heating by using a heat pump.

2. Description of the Related Art

A known conventional heat pump type heating apparatus for performing both air heating and floor heating by using a common heat pump is described in Published Japanese Unexamined Patent Application No. 61-145244. In this heat pump type heating apparatus, air heating and floor heating are simultaneously started at the start of a heating operation.

FIG. 12 is a diagram showing a refrigeration cycle of this heat pump type heating apparatus. As shown in FIG. 12, a refrigeration cycle 1 is constituted by a variable capacity compressor 2, a four-way valve 3, an outdoor heat exchanger 4, an expansion valve 5, an indoor heat exchanger 6, and a floor heating panel 7. The heating apparatus also comprises an inverter 13 for driving the compressor 2 in accordance with temperature data from a floor temperature sensor 8 and an indoor heat exchanger sensor 9 which are attached to the refrigeration cycle, and a controller 11 for controlling an indoor (ventilation) fan 10 of the indoor heat exchanger 6.

As shown in FIG. 12, a valve 12 is open in a cooling mode in which the four-way valve 3 is located at a position indicated by a broken line to bypass a refrigerant to the floor heating panel 7.

FIG. 13 shows control states in a heating mode. An operating frequency (Hz) of the inverter and an air amount of the indoor fan 10 are controlled to be predetermined values in a rise period ①, a transition period ②, and a steady period ③.

Air heating and floor heating are simultaneously started at the time of start of the heating operation, as described above.

FIGS. 14 and 15 are a graph showing changes over time in an indoor heat exchanger condensation temperature Tc, a floor heating panel temperature Tp, and a room temperature Ta from the start of the heating operation in accordance with control of the conventional heating apparatus shown in FIG. 13, and a graph showing operating states of the compressor 2 and the indoor (ventilation) fan 10 in the conventional heating apparatus.

FIG. 16 is a Mollier diagram showing a relationship between pressures and enthalpies in the conventional apparatus.

As shown in FIG. 14, a refrigerant discharged from the compressor 2 in the heating operation mode is supplied to the indoor heat exchanger and then serially flows into the floor heating panel 7. Therefore the condensation temperature of the indoor heat exchanger 6 is almost equal to the condensation temperature of the floor heating panel 7. At this time, the temperature of the floor heating panel 7 must be determined in consideration of a danger of a low-temperature burn. For this reason, a temperature of a rug surface must be about 30° C. or less. A maximum temperature of the rug surface must be about 45° C. even if the heat resistance of the rug is taken into consideration. If warm air supplied from the indoor heat exchanger 6 is as low as 45° C. or less, a rise period of the heating operation is undesirably prolonged. At the same time, in a steady operation, the room temperature cannot be increased to a desired temperature.

SUMMARY OF THE INVENTION

It is, therefore, an object of the present invention to provide a new and improved heat pump type heating apparatus with air heating and floor heating, which can shorten a rise period of the heating operation and can adjust the room temperature to a desired temperature in a steady operation state.

It is another object of the present invention to provide a heat pump type heating apparatus and a control method thereof, which can shorten a rise period of the heating operation and adjust the room temperature to a desired temperature in a steady operation state.

According to one aspect of the present invention, there is provided a heat pump type heating apparatus comprising:

a refrigeration cycle which constitutes a closed cycle for circulating a refrigerant therein and includes at least a variable capacity compressor, an outdoor heat exchanger, an expansion valve, and an indoor heat exchanger, the indoor heat exchanger being provided with a room temperature sensor and an indoor fan;

a floor heating panel connected in parallel with the indoor heat exchanger in the refrigeration cycle, the floor heating panel being provided with a floor temperature sensor;

a flow control valve arranged in a refrigerant upstream side of the floor heating panel at a heating operation;

control means for controlling the variable capacity compressor, the indoor fan, and the flow control valve in a first predetermined drive state at the start of a heating operation, to thereby simultaneously start air heating by the indoor heat exchanger and floor heating by the floor heating panel;

a second predetermined drive state when a detection output from the room temperature sensor reaches a preset value, to maintain a room temperature by the air heating and increase a floor temperature by the floor heating; and controlling at least one of the variable capacity compressor and the flow control valve in a third predetermined drive state when a detection output from the floor temperature sensor reaches a preset value, to maintain the floor temperature by the floor heating; and for controlling at least one of the variable capacity compressor and the indoor fan in a fourth predetermined drive state, to thereby control the room temperature by the air heating to a predetermined value.

According to another aspect of the present invention, there is provided a control method for controlling a heat pump type heating apparatus, the method comprising the steps of:

preparing a refrigeration cycle which constitutes a closed cycle for circulating a refrigerant therein and includes at least a variable capacity compressor, an outdoor heat exchanger, an expansion valve, and an indoor heat exchanger, the indoor heat exchanger being provided with a room temperature sensor and an indoor fan;

preparing a floor heating panel connected in parallel with the indoor heat exchanger in the refrigeration cycle, the floor heating panel being provided with a floor temperature sensor;

preparing a flow control valve arranged in a refrigerant upstream side of in the floor heating panel at a heating operation;

first controlling the variable capacity compressor, the indoor fan, and the flow control valve in a first predetermined drive state at the start of a heating operation, to simultaneously start air heating by the indoor heat exchanger and floor heating by the floor heating panel, second controlling the variable capacity compressor, the indoor fan, and the flow control valve in a second predetermined drive state when a detection output from the room temperature sensor reaches a preset value, to maintain a room temperature by the air heating and increase a floor temperature by the floor heating; and third controlling at least one of the variable capacity compressor and the flow control valve in a third predetermined drive state when a detection output from the floor temperature sensor reaches a preset value, to maintain the floor temperature by the floor heating; and controlling at least one of the variable capacity compressor and the indoor fan in a fourth predetermined drive state, to control the room temperature by the air heating to a predetermined value.

According to the heating apparatus having the above arrangement and a control method thereof, the refrigerant is independently supplied to the indoor heat exchanger and the floor heating panel, and the flow rates of the refrigerant supplied to these members can be independently controlled. Independent temperature management operations can be performed. Since the indoor heat exchanger temperature can be set to be higher than the floor heating panel temperature at the start of a heating operation, the room temperature can be immediately increased to a set temperature. Since an amount of refrigerant in the floor heating panel can be controlled by the flow control valve in the steady operation mode, the room temperature can be adjusted while the temperature of the floor heating panel can be kept constant.

According to still another aspect of the present invention, there is provided a heat pump type heating apparatus comprising:

a refrigeration cycle which constitutes a closed cycle for circulating a refrigerant therein and includes two series-connected compressors including at least one variable capacity compressor, an outdoor heat exchanger, an expansion valve, and an indoor heat exchanger, the indoor heat exchanger being provided with a room temperature sensor and an indoor fan;

a floor heating panel connected in a bypass circuit, the bypass circuit being formed between a low-pressure discharge portion of the two-series connected compressors in the refrigeration cycle and the expansion valve, and the floor heating panel being provided with a floor temperature sensor;

a flow control valve arranged in a refrigerant upstream side of the floor heating panel at a heating operation;

control means for controlling the two compressors, the indoor fan, and the flow control valve in a first predetermined drive state at the start of a heating operation, to thereby simultaneously start air heating by the indoor heat exchanger and floor heating by the floor heating panel;

in a second predetermined drive state when a detection output from the room temperature sensor reaches a preset value, to maintain a room temperature by the air heating and increase a floor temperature by floor heating; and for controlling at least one of the two compressors and the flow control vale in a third predetermined drive state when a detection output from the floor temperature sensor reaches a preset value, to maintain the floor temperature by the floor heating; and for controlling at least one of the two compressors and the indoor fan in a fourth predetermined drive state, to control the room temperature, by air heating, to a predetermined value.

In the heating apparatus having the above arrangement, the low-stage (low pressure) discharge pipe of the compressor is connected to the floor heating panel, and the high-stage (high pressure) discharge pipe of the compressor is connected to the indoor heat exchanger. The temperature of the indoor heat exchanger can be set to be higher than that of the floor heatin panel. Therefore, the room temperature can be immediately increased to the set temperature.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a table showing a control sequence of a flow control valve, solenoid valves, an inverter, and an indoor fan by a controller shown in FIG. 1;

FIGS. 5 and 6 are refrigeration cycle diagrams showing arrangements of heat pump type heating apparatuses according to the second and third embodiments of the present invention;

FIG. 9 is a table showing a control sequence of solenoid valves, an inverter, and an indoor fan by a controller shown in FIG. 7;

DETAILED DESCRIPTION OF THE PREFERRED EMBODIMENTS

Figure 1:
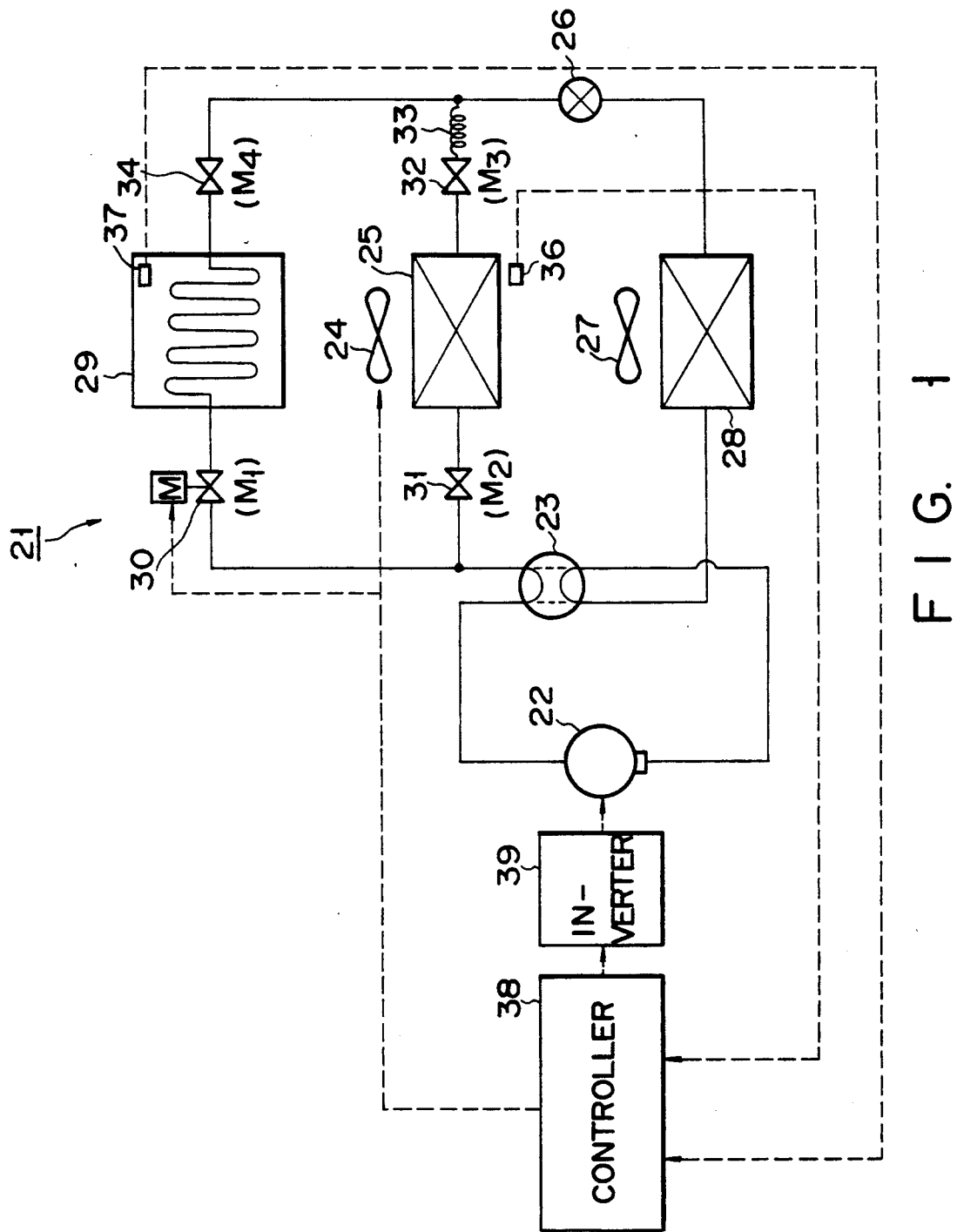
FIG. 1 is a diagram of a refrigeration cycle showing an arrangement of a heat pump type heating apparatus according to a first embodiment of the present invention.

Reference will now be made in detail to the presently preferred embodiments of the invention as illustrated in the accompanying drawings, in which like reference characters designate like or corresponding parts throughout the several drawings.

Several embodiments of the present invention will be described with reference to the accompanying drawings.

FIG. 1 is a refrigeration cycle diagram showing an arrangement of a heat pump type heating apparatus according to the first embodiment of the present invention. Referring to FIG. 1, a refrigeration cycle 21 constitutes a closed cycle which comprises a variable capacity compressor 22, a four-way valve 23 for switching between cooling and heating, an indoor heat exchanger 25 having an indoor fan 24, an expansion valve 26, an outdoor heat exchanger 28 having an outdoor fan 27, and a floor heating panel 29, and circulates a refrigerant therein. The floor heating panel 29 is connected in parallel with the indoor heat exchanger 25 through a refrigerant pipe. A flow control valve (solenoid valve) 30 is arranged in an upstream refrigerant pipe in the heating operation of the floor heating panel 29 to control a flow rate of the refrigerant supplied to the floor heating panel 29. The four-way valve 23 is switched to a state indicated by a solid line in FIG. 1 during heating and to a state indicated by a broken line in FIG. 1 during cooling.

The indoor heat exchanger 25 and the floor heating panel 29 are connected in parallel with each other through solenoid valves 31 and 32 arranged on both sides of the indoor heat exchanger 25, a restrictor mechanism 33, and the flow control valve 30 and a solenoid valve 34 which are arranged on both sides of the floor heating panel 29. The restrictor mechanism 33 is arranged to balance the pressure for the flow control valve 30.

The indoor heat exchanger 25 and the floor heating panel 29 respectively include a room temperature sensor 36 and a floor temperature sensor 37. Outputs from the sensors 36 and 37 are supplied to a controller 38 using a microcomputer and its peripheral devices. The controller 38 controls an output frequency (speed of a drive motor for the variable capacity compressor 22) of an inverter 39 serving as a drive source of a motor in the variable capacity compressor 22, controls the indoor fan 24 and the flow control valve 30, and controls opening/closing of the solenoid valves 31, 32, and 34.

Figure 3:
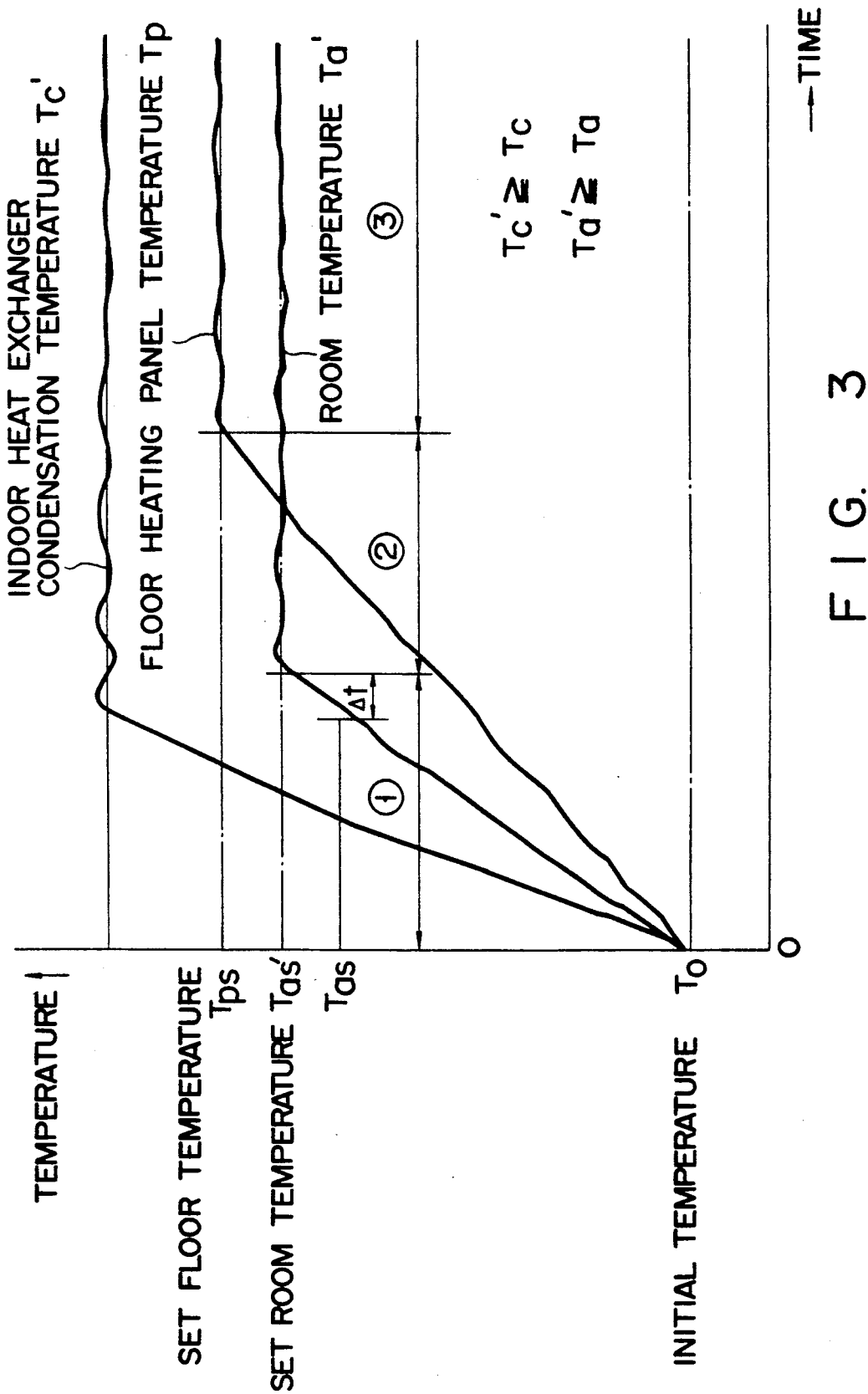
FIGS. 3 and 4 are timing charts showing a relationship between temperatures of the respective components during the respective periods in FIG. 2 and operating states of the indoor fan, the inverter, and the flow control valve.
Figure 4:
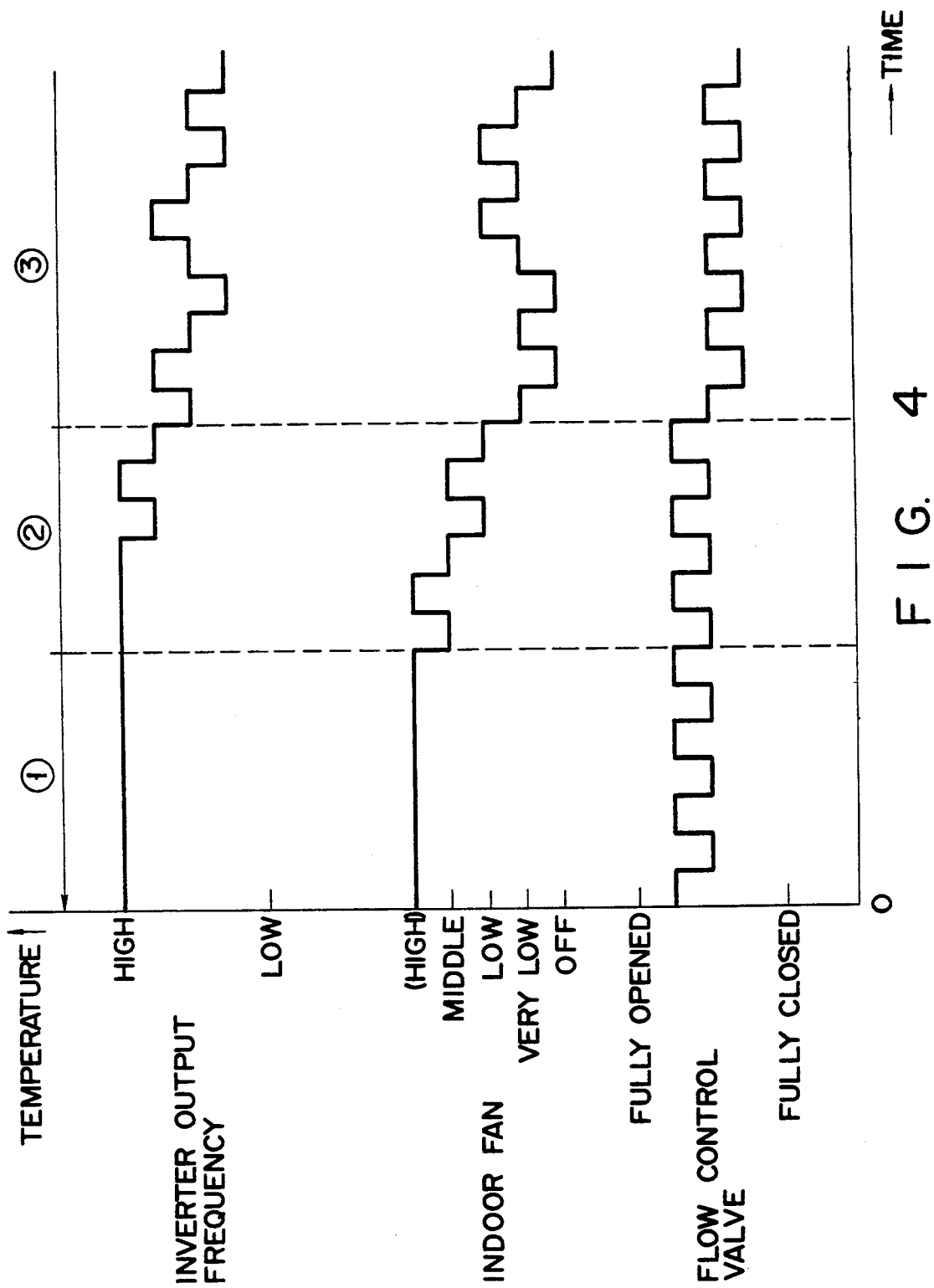

An operation of this embodiment at the time of start of heating will be described with reference to FIGS. 2 to 4. FIG. 2 shows a control sequence of the flow control valve 30 (Ml), the solenoid valves 31, 32, and 34 (M2 to M4), the inverter 39, and the indoor fan 24 during periods ① to ③ in FIGS. 3 and 4. FIGS. 3 and 4 are timing charts showing relationships of the operating states of the indoor fan 24, the inverter 39, and the flow control valve 30 and temperatures (during the periods ① to ③) of the respective components in the refrigeration cycle 21 controlled on the basis of the control sequence shown in FIG. 2.

At time 0 during the period ①, the solenoid valves 31, 32, and 34 (M2 to M4) are opened, and the flow control valve 30 is restricted in accordance with a heat resistance of the floor heating panel 29. The indoor fan 24 is driven to simultaneously start air heating by the indoor heat exchanger 25 and floor heating by the floor heating panel 29.

At this time, the output frequency of the inverter 39 is maximized to obtain a maximum speed of the drive motor for the variable capacity compressor 22. The indoor fan 24 is operated in a given mode, e.g., at a high air level. At this time, the refrigerant parallelly flows in the indoor heat exchanger 25 and the floor heating panel 29. The amount of refrigerant flowing in the floor heating panel 29 is controlled by the flow control valve 30, and all the remaining refrigerant flows in the indoor heat exchanger 25. That is, at the start of the heating operation, although the refrigerant flows in an amount exceeding a required amount, since the heat conduction area of the floor heating panel 29 is constant and since natural convection and heat dissipation occur, the amount of refrigerant to be condensed is limited. Therefore, the amount of refrigerant supplied to the floor heating panel 29 is optimally controlled by the flow control valve 30.

Figure 14:
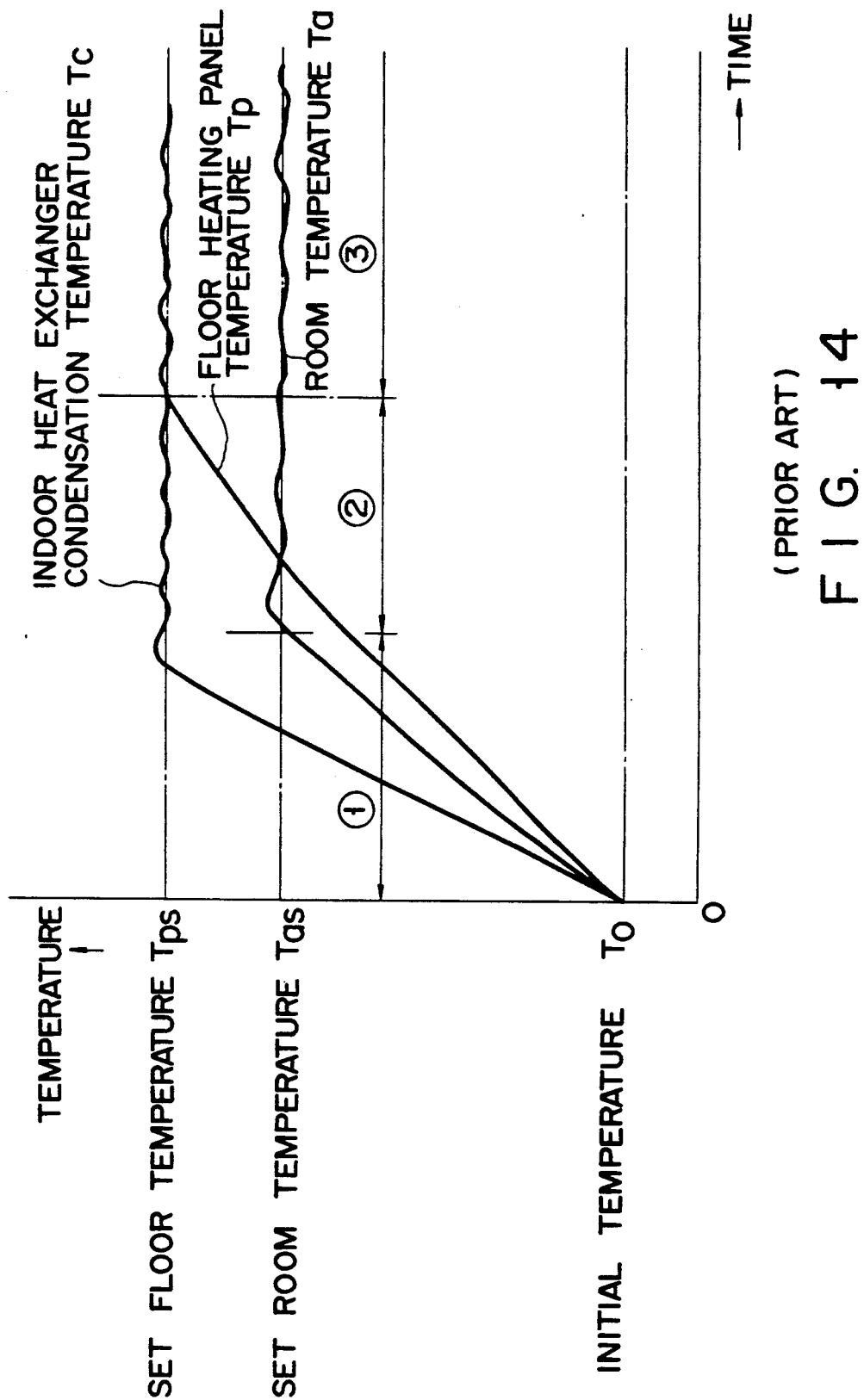
FIGS. 14 and 15 are timing charts showing a relationship between the operating states during the respective periods shown in FIG. 8.
Figure 15:
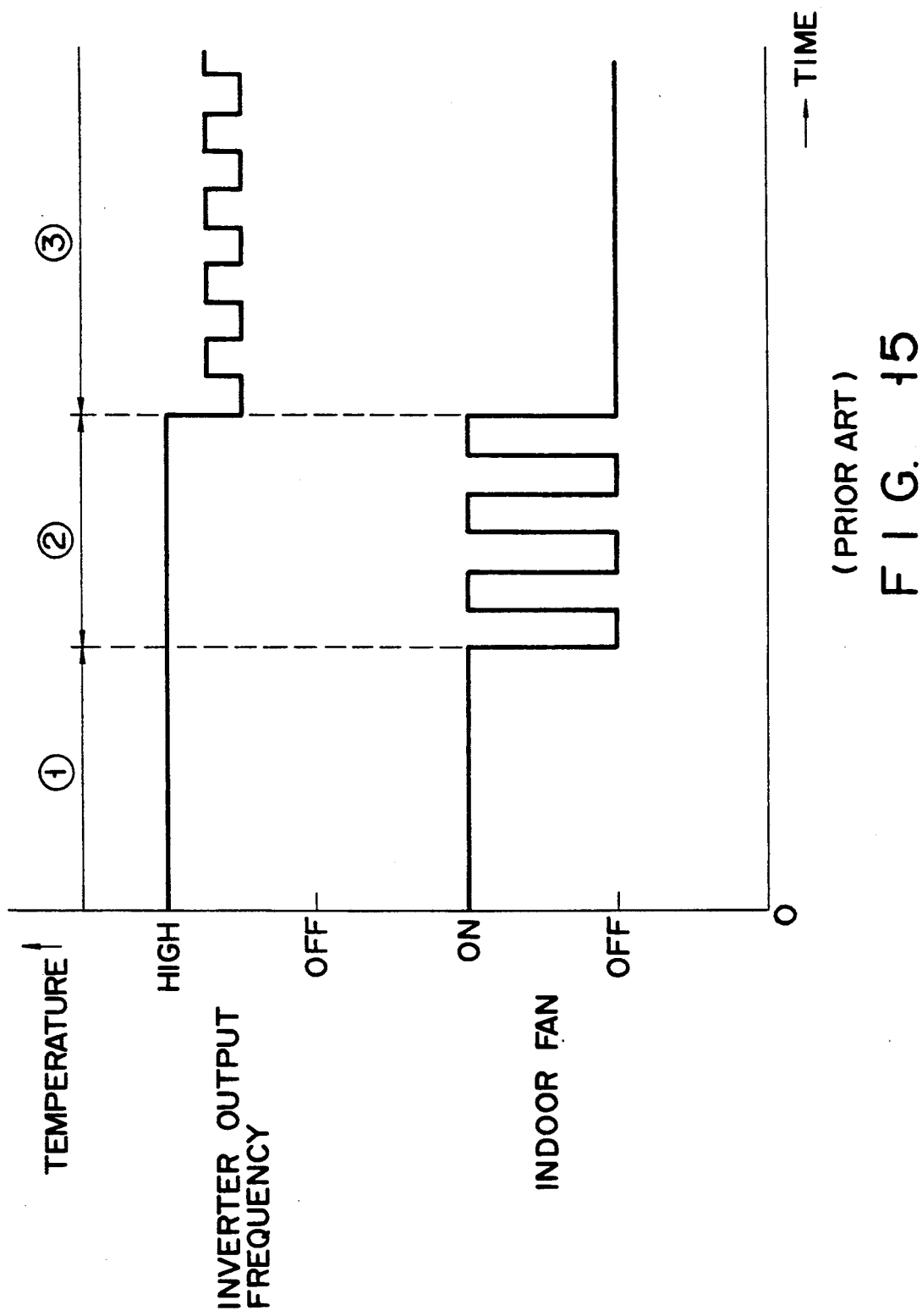
Figure 16:
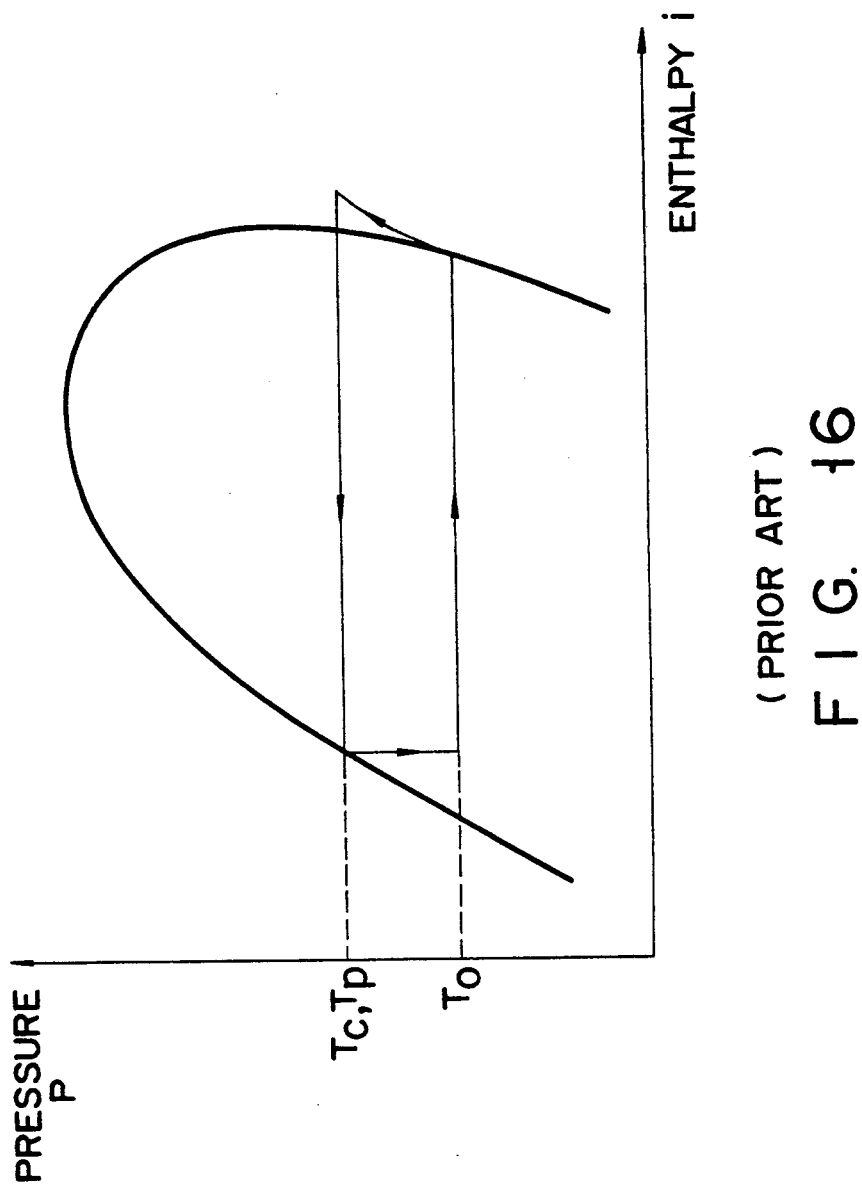
FIG. 16 is a Mollier diagram showing a relationship between pressures and enthalpies in the conventional apparatus.

A room temperature Ta' is immediately increased, from an initial temperature T0 to a set room temperature Tas'. The room temperature Tas' is preset in the controller 38. Temperatures of this embodiment are compared with those of the conventional case in the timing chart of FIG. 14. Although the floor heating panel temperature Tp of this embodiment is increased substantially at the same rate as that of the conventional case, the room temperature Ta' is increased faster than that in the conventional case. A rise period required for the set room temperature Tas' is shorter than that of the conventional case by a period Δ (about 10 to 30 min).

During the period ②, when the room temperal Ta reaches the set room temperature Tas', the operation of the indoor fan 24 is changed to a controlled operation, the operation of the flow control valve 30 is maintained in a controlled operation, and the output frequency of the inverter 39 is maximized or set in a controlled operation. The capacities of the above components are reduced to a level required for the start of floor heating and maintenance of the room temperature. Since the set room temperature Tas' can be set independently of the temperature of the floor heating panel 29, it can be set to be higher than the conventional set room temperature Tas due to the following reason. In the conventional arrangement, since the indoor heat exchanger 6 is connected in series with the floor heating panel 7, the temperature of the floor heating panel 7 cannot be increased to a temperature exceeding a predetermined temperature in consideration of protection of human bodies from low-temperature burns. Therefore, the temperature of the indoor heat exchanger 26 cannot be increased exceeding a predetermined temperature.

During the period ③, when the temperature of the floor heating panel 29 reaches the set floor temperature Tps preset in the controller 38, an amount of air of the indoor fan 24, the degree of opening of the flow control vale 30, and the output frequency of the inverter 39 are further reduced. The controller 38 controls so that the room temperature Ta' and the floor heating panel temperature Tp maintain predetermined values. The period ③ represents a steady operation state. However, since a condensation temperature Tc' of the indoor heat exchanger 25 can be set higher than the conventional condensation temperature Tc, the room temperature Ta' can be set to be higher than the conventional room temperature Ta. The temperature Tp of the floor heatin panel 29 is controlled to be the same temperature as the conventional room temperature due to the limitations imposed by a requirement for prevention of low-temperature burns.

Since the apparatus of this embodiment can be operated as described above, the temperature of the indoor heat exchanger can be set to be higher than the temperature of the floor heating panel. The room temperature can be immediately increased to the set temperature. Since the flow rate of the refrigerant in the floor heating panel can be controlled by the flow control valve in the steady operation state, the room temperature can be adjusted to a desired temperature while the temperature of the floor heating panel is kept at the predetermined temperature.

Referring to FIG. 1, although the solenoid valve 3 is connected in series with the restrictor mechanism 33, a flow control valve which is normally kept in a controlled state may be used in place of the series connection.

Figure 5:
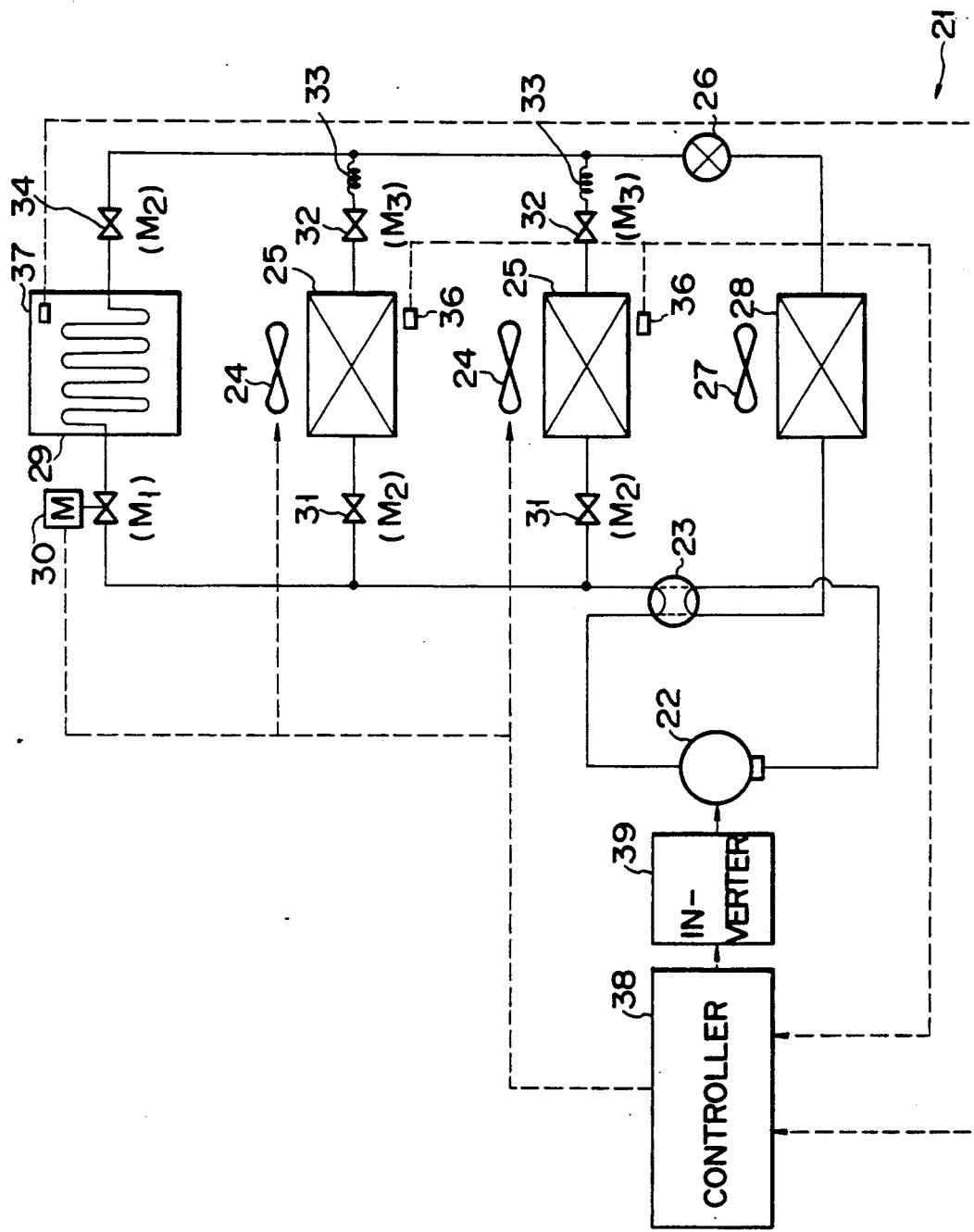

FIG. 5 is a refrigeration cycle diagram showing an arrangement of a heat pump heating apparatus according to the second embodiment of the present invention. As shown in FIG. 5, the apparatus is a two-chamber multi heat pump type heating apparatus. One of the chambers in this apparatus is the same as a conventional multi-air conditioner, but the other chamber can be operated in both air heating and floor heating modes. The latter chamber can provide the same effect as in the first embodiment.

FIG. 6 is a refrigeration cycle diagram showing an arrangement of a heat pump type heating apparatus according to the third embodiment of the present invention. This apparatus is also a two-chamber multi-heat pump type heating apparatus. In this apparatus, each chamber can be operated in both air heating and floor heating modes. With this arrangement, the same effect as in the first embodiment can be obtained in each chamber.

In the second and third embodiments, the number of rooms to be heated is not limited to two rooms. If the number of rooms to be heated is three or more, the same effect as described above can be obtained.

As described above in detail, in the heat pump type heating apparatuses according to the first to third embodiments of the present invention, since the temperature of the indoor heat exchanger ca be set to be higher than that of the floor heating panel at the start of the heating operation, the room temperature can be immediately increased to the set temperature. In the steady operation state, since the flow rate of the refrigerant in the floor heating panel can be controlled by the flow control valve, the room temperature can be adjusted to a desired temperature while the temperature of the floor heating panel is kept at a predetermined temperature.

In each embodiment described above, the flow rates of the refrigerant supplied to the indoor heat exchanger and the floor heating panel are independently controlled.

Embodiments in each of which a low-pressure discharge pipe of a compressor is connected to a floor heating panel and a low-pressure discharge pipe of a compressor is connected to an indoor heat exchanger will be described below.

Figure 7:
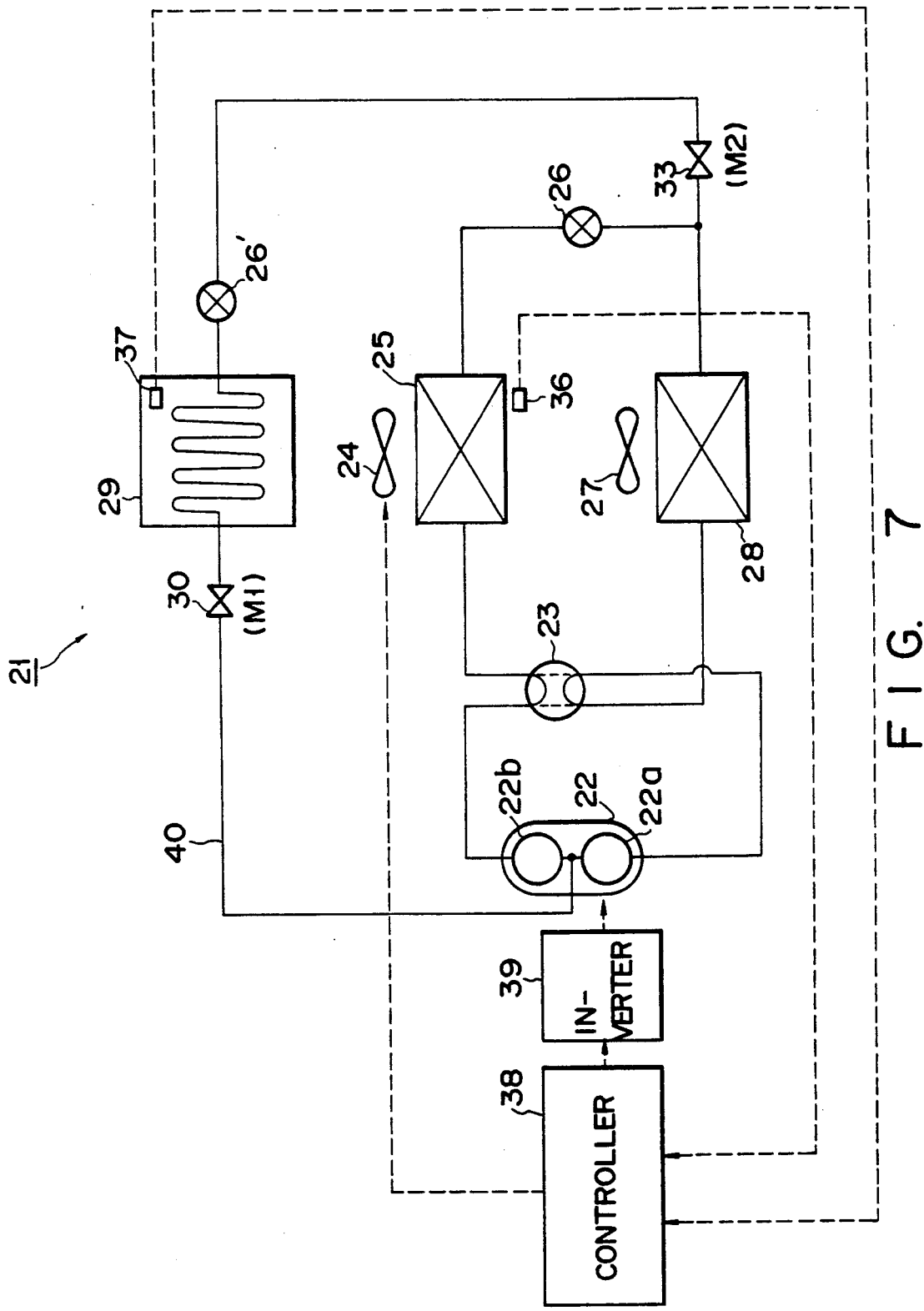
FIG. 7 is a refrigeration cycle diagram showing an arrangement of a heat pump type heating apparatus according to the fourth embodiment of the present invention.

FIG. 7 is a refrigeration cycle diagram showing an arrangement of a heat pump type heating apparatus according to the fourth embodiment of the present invention. A refrigeration cycle 21 constitutes a closed cycle obtained by sequentially connecting a variable capacity compressor 22, a four-way valve 23 for switching between cooling and heating, an indoor heat exchanger 25 having an indoor fan 24, an expansion valve 26, and an outdoor heat exchanger 28 having an outdoor fan 27 through refrigerant pipes.

The variable capacity compressor 22 has two cylinders connected in series with each other. The variable capacity compressor 22 is a two-stage variable capacity compressor having two stages as low- and high-pressure stages. More specifically, the variable capacity compressor 22 has a low-pressure compressor 22a and a high-pressure compressor 22b.

The low- and high-pressure compressors 22a and 22b, i.e., the discharge pipe of the low-pressure compressor 22a and the refrigerant pipe between the expansion valve 26 and the outdoor heat exchanger 28, communicate with each other through a bypass circuit 40.

A solenoid valve (M1) 30, a floor heating panel 29, an expansion valve 26, and a solenoid valve (M2) 33 are sequentially arranged in the order named from a refrigerant pipe of the bypass circuit 40 near the discharge side of the low-pressure compressor 22a.

The four-way valve 23 is switched to a state indicated by the solid line in FIG. 7 in the heating mode, and is switched to a state indicated by a broken line in FIG. 7 in a cooling mode.

The indoor heat exchanger 25 and the floor heating panel 29 include a room temperature sensor 36 and a floor temperature sensor 37, respectively. Outputs from these sensors 36 and 37 are supplied to a controller 38 using a microcomputer and its peripheral devices. The controller 38 controls an output frequency (i.e., speed of the variable capacity compressor 22) of an inverter 39 serving as a drive source for a motor in the variable capacity compressor 22, controls the indoor fan 24, and controls opening/closing of the solenoid valves 30 and 33.

Figure 8:
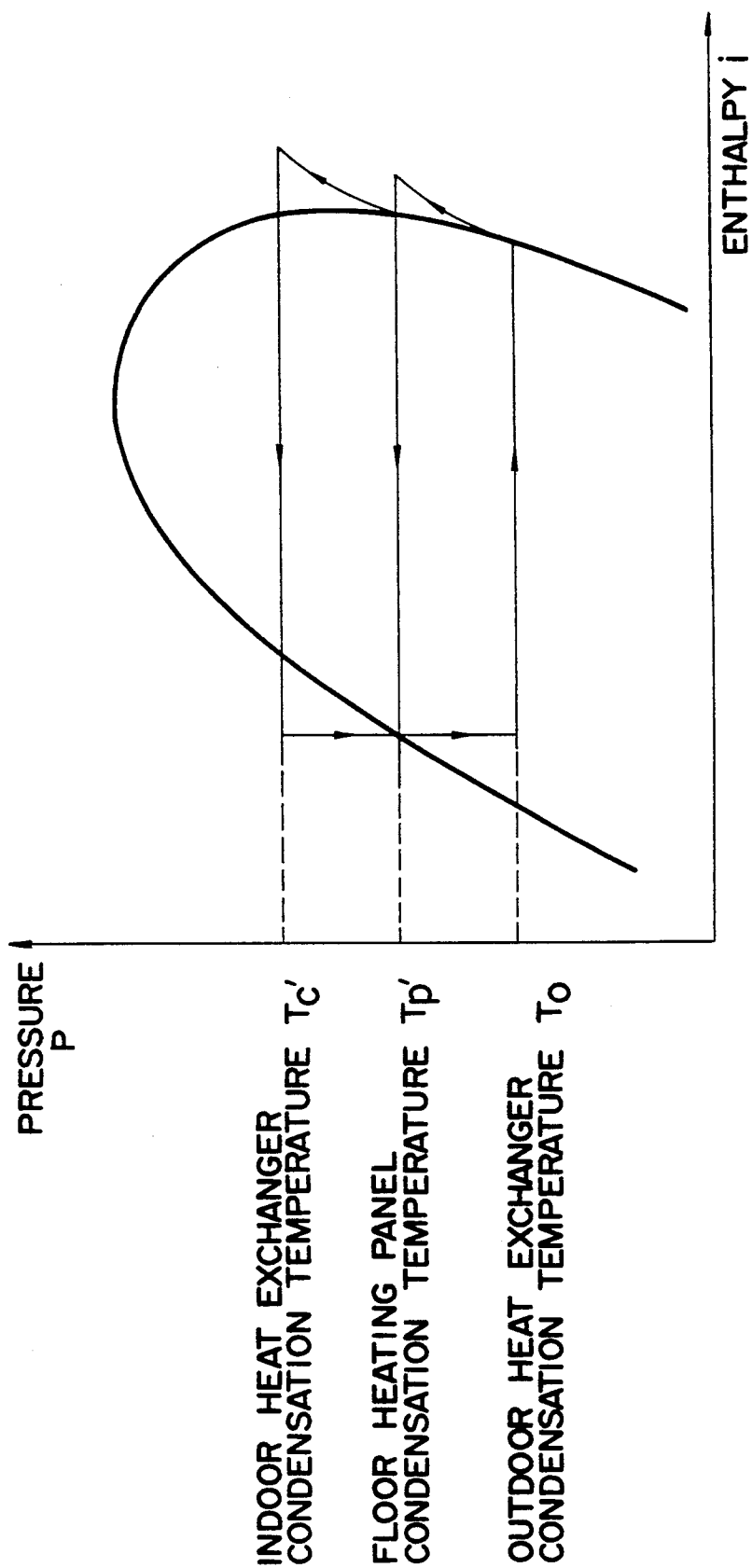
FIG. 8 is a Mollier diagram showing a relationship between pressures and enthalpies of the heat pump type heating apparatus according to the fourth embodiment of the present invention.
Figure 10:
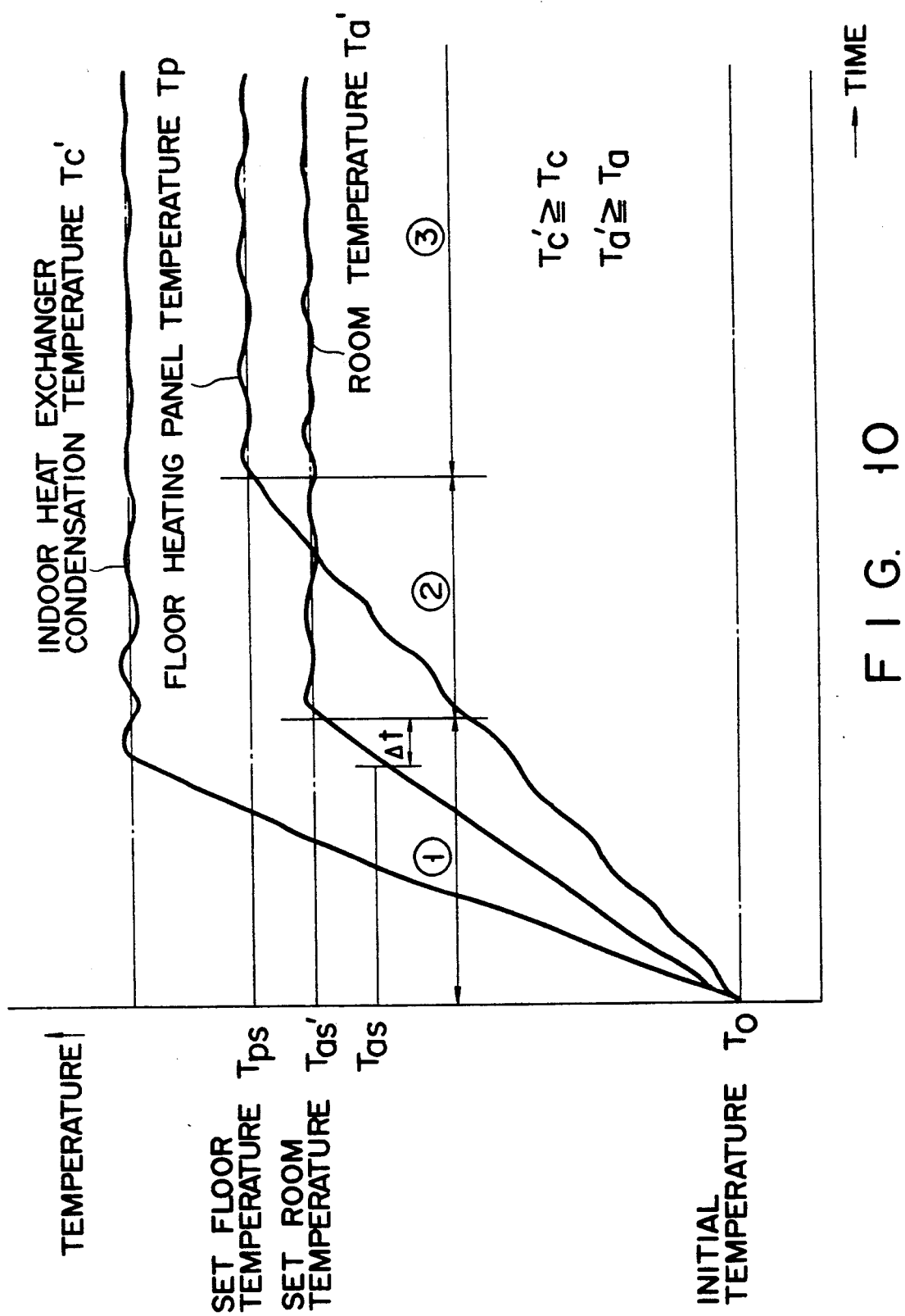
FIG. 10 is a timing chart showing a relationship between operating states with changes over time in the temperatures of the respective components during the respective periods in FIG. 9.

An operation at the start of heating according to this embodiment will be described with reference to FIGS. 8 to 10. FIG. 8 is a Mollier diagram showing a relationship between pressures and enthalpies in the heat pump type heating apparatus according to the fourth embodiment of the present invention. FIG. 9 shows a control sequence of the solenoid valves 30 (M1) and 33 (M2), the inverter 39, and the indoor fan 24 during periods ① to ③. FIG. 10 is a timing chart showing a relationship between operating states with changes over time in temperatures of the respective parts during the periods ① to ③ in FIG. 9.

In a heating mode, the four-way valve 23 is switched to a state indicated by the solid line in FIG. 7.

At time 0 during the period ①, the solenoid valves 30 (Ml) and 33 (M2) are opened, and the indoor fan 24 is driven to simultaneously start air heating by the indoor heat exchanger 25 and floor heating by the floor heating panel 29.

At this time, the output frequency of the inverter 39 is maximized to set a maximum speed of the variable capacity compressor 22. The indoor fan 24 is operated in a given mode, e.g., at a high air level or the like. At this time, the refrigerant is simultaneously supplied from the high-pressure compressor 22b to the indoor heat exchanger 25 and from the low-pressure compressor 22a to the floor heating panel 29. Since the refrigerant flowing through the low-pressure compressor 22a, i.e., the compressed refrigerant, is supplied to the high-pressure compressor 22b, the respective condensation temperatures have two steps, as shown in FIG. 8. That is, a condensation temperature Tc' of the indoor heat exchanger 25 can be set to be higher than a condensation temperature Tp of the floor heating panel 29.

A room temperature Ta' is immediately increased from an initial temperature T0 to a set room temperature Tas'. The room temperature Tas' is preset in the controller 38. Temperatures of this embodiment are compared with those of the conventional case in the timing chart of FIG. 14. Although the floor heating panel temperature Tp of this embodiment is increased substantially at the same rate as that of the conventional case, the room temperature Ta' is increased faster than that of the conventional case. A rise period required for the set room temperature Tas' is shorter than that of the conventional case by a period Δt (about 10 to 30 min).

During the period ②, when the room temperature Ta reaches the set room temperature Tas', the operation of the indoor fan 24 is changed to a controlled operation, and the output frequency of the inverter 39 is maximized or set in a controlled operation. The capacities of the above components are reduced to a level required for the start of floor heating and maintenance of the room temperature. Since the set room temperature Tas' can be set independently of the temperature of the floor heating panel 29, it can be set to be higher than the conventional set room temperature Tas due to the following reason. In the conventional arrangement, since the indoor heat exchanger 6 is connected in series with the floor heating panel 7, the temperature of the floor heating panel 7 cannot be increased to a temperature exceeding a predetermined temperature in consideration of protection of human bodies from low-temperature burns. Therefore, the temperature of the indoor heat exchanger 26 cannot be increased exceeding a predetermined temperature.

During the period ③, when the temperature of the floor heating panel 28 reaches the set floor temperature Tps preset in the controller 38, an amount of air of the indoor fan 24 and the output frequency of the inverter 39 are further reduced. The controller 38 controls so that the room temperature Ta' and the floor heating panel temperature Tp maintain predetermined values. The period 3 represents a steady operation state. However, since a condensation temperature Tc' of the indoor heat exchanger 25 can be set higher than the conventional condensation temperature Tc, the room temperature Ta' can be set to be higher than the conventional room temperature Ta. The temperature Tp of the floor heating panel 29 is controlled to be the same temperature as the conventional room temperature due to the limitations imposed by a requirement for prevention of low-temperature burns.

Since the apparatus of this embodiment can be operated as described above, the temperature of the indoor heat exchanger can be set to be higher than the temperature of the floor heating panel. The room temperature can be immediately increased to the set temperature.

Figure 11:
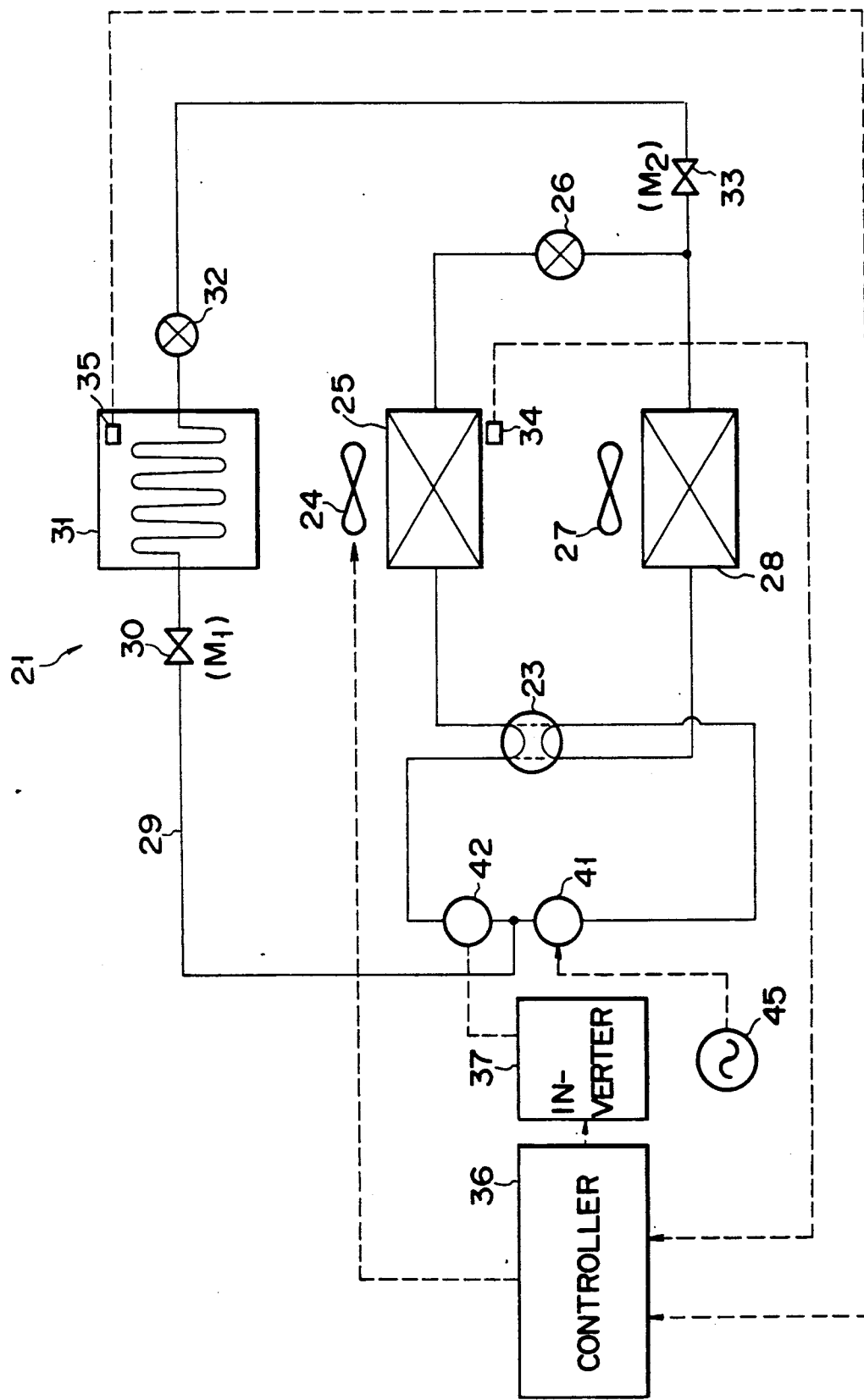
FIG. 11 is a refrigeration cycle diagram showing an arrangement of a heat pump type heating apparatus according to the fifth embodiment of the present invention.
Figures 12, 13:
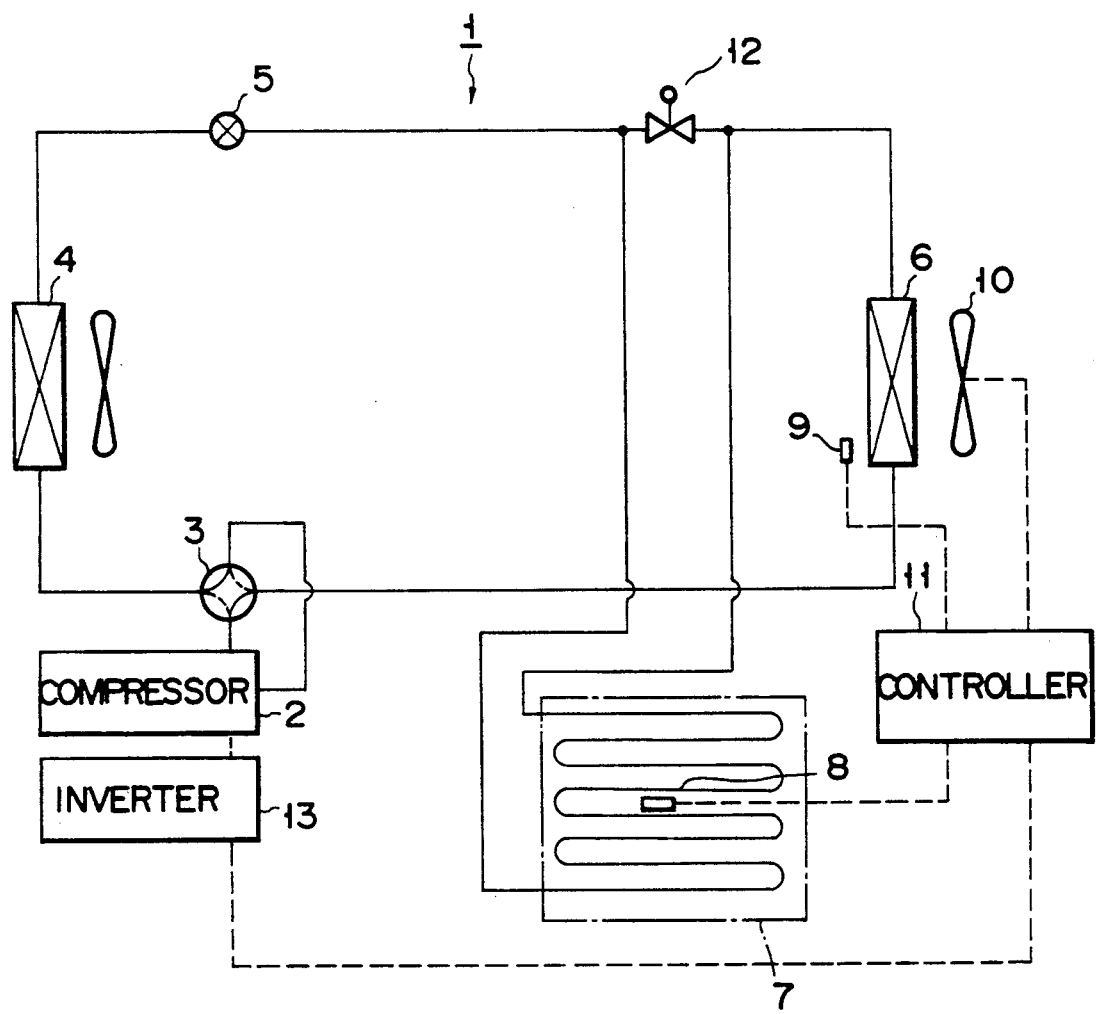
FIG. 12 is a refrigeration cycle diagram showing an arrangement of a conventional heat pump type heating apparatus.
FIG. 13 is a table showing control of the conventional heat pump type heating apparatus.

FIG. 11 is a refrigeration cycle diagram showing an arrangement of a heat pump type heating apparatus according to the fifth embodiment of the present invention.

Referring to FIG. 11, a compressor is perfectly divided into two compressors 41 and 42. With this arrangement, independent rotating shafts must be used for these compressors. The low-pressure compressor (fixed capacity compressor) 41 driven by a motor having a fixed speed and driven by an AC power source 45 is used for a floor heating panel 29 which requires a predetermined temperature or less. The high-pressure compressor 42 variably driven by a motor by means of an inverter 43 is connected to an indoor heat exchanger 25 which requires high-temperature blow air, thereby obtaining the same effect as in the fourth embodiment. These compressors can be easily controlled.

In the above arrangement, the low-pressure compressor 41 may be a variable capacity compressor driven by the inverter.

As has been described in detail above, in each of the heat pump type heating apparatuses according to the fourth and fifth embodiments of the present invention, the low-stage (low pressure) discharge pipe of the compressor is connected to the floor heating panel, and the high-stage (high pressure) discharge pipe of the compressor is connected to the indoor heat exchanger. Therefore, the temperature of the indoor heat exchanger can be set to be higher than that of the floor heating panel. Therefore, the room temperature can be immediately increased to the set temperature.

According to the present invention, therefore, there is provided a heat pump type heating apparatus and a control method thereof, which can shorten a rise period of the heating operation and adjust the room temperature to a desired temperature in a steady operation state.

Additional embodiments of the present invention will be apparent to those skilled in the art from consideration of the specification and practice of the present invention disclosed therein. It is intended that the specification and examples be considered as exemplary only, with the true scope of the present invention being indicated by the following claims.

What is claimed is:

1. A heat pump type heating apparatus comprising:
   a refrigeration cycle which constitutes a closed cycle for circulating a refrigerant therein and includes at least a variable capacity compressor, an outdoor heat exchanger, an expansion valve, and an indoor heat exchanger being provided with a room temperature sensor and an indoor fan;
   a floor heating panel connected in parallel with said indoor heat exchanger in the refrigeration cycle, said floor heating panel being provided with a floor temperature sensor;
   a flow control valve arranged in a refrigerant upstream side of said floor heating panel at a heating operation; and
   control means for
   (A) controlling said variable capacity compressor, said indoor fan, and said flow control valve in a first predetermined drive state at a start of a heating operation, to simultaneously start air heating by said indoor heat exchanger and floor heating by said floor heating panel;

(B) controlling said variable capacity compressor, said indoor fan, and said flow control valve in a second predetermined drive state when a detection output from said room temperature sensor reaches a preset value, to maintain a room temperature by said air heating and increase a floor temperature by said floor heating;

(C) controlling at least one of said variable capacity compressor and said flow control valve in a third predetermined drive state when a detection output from said floor temperature sensor reaches a preset value, to maintain the floor temperature by said floor heating, and (D) controlling at least one of said variable capacity compressor and said indoor fan in a fourth predetermined drive state, to control the room temperature to a predetermined value by said air heating.

2. An apparatus according to claim 1, further comprising first and second solenoid valves arranged in refrigerant upstream and downstream sides of said indoor heat exchanger at the heating operation, respectively.

3. An apparatus according to claim 2, further comprising a third solenoid valve arranged in a refrigerant downstream side of said floor heating panel at the heating operation.

4. An apparatus according to claim 1, further comprising pressure balancing means, arranged on the refrigerant downstream side of said indoor heat exchanger at the heating operation, for balancing a pressure for said flow control valve.

5. An apparatus according to claim 4, wherein said pressure balancing means includes a restrictor mechanism.

6. An apparatus according to claim 1, wherein said control means controls the degree of opening of said flow control valve and the amount of air of said indoor fan in the first to fourth predetermined drive states in accordance with outputs from said room temperature sensor and said floor temperature sensor, and an inverter for controlling said variable capacity compressor in accordance with an output from said controller.

7. An apparatus according to claim 1, wherein said indoor heat exchanger is arranged in each of a plurality of rooms to be heated, and said floor heating panel is connected in parallel with a given indoor heat exchanger arranged in at least one of the plurality of rooms.

8. An apparatus according to claim 1, wherein said indoor heat exchanger is arranged in each of a plurality of rooms to be heated, and said floor heating panel is connected in parallel with each of said indoor heat exchangers respectively arranged in the plurality of rooms.

9. A control method for controlling a heat pump type heating apparatus, said method comprising the steps of:
preparing a refrigeration cycle which constitutes a closed cycle for circulating a refrigerant therein and includes at least a variable capacity compressor, an outdoor heat exchanger, an expansion valve, and an indoor heat exchanger, said indoor heat exchanger being provided with a room temperature sensor and an indoor fan;

connecting a floor heating panel in parallel with said indoor heat exchanger in the refrigeration cycle, said floor heating panel being provided with a floor temperature sensor;

arranging a flow control valve in a refrigerant upstream side of said floor heating panel at the heating operation;

first controlling said variable capacity compressor, said indoor fan, and said flow control valve in a first predetermined drive state at start of a heating operation, to simultaneously start air heating by said indoor heat exchanger and floor heating by said floor heating panel;

second controlling said variable capacity compressor, said indoor fan, and said flow control valve in a second predetermined drive state when a detection output from said room temperature sensor reaches a preset value, to maintain a room temperature by said floor heating and increase a floor temperature by said floor heating;

third controlling at least one of said variable capacity compressor and said flow control valve in a third predetermined drive state when a detection output from said floor temperature sensor reaches a preset value, to maintain the floor temperature by said floor heating; and fourth controlling at least one of said variable capacity compressor and said indoor fan in a fourth predetermined drive state, to control the room temperature to a predetermined value by said air heating.

10. A heat pump type heating apparatus comprising:
a refrigeration cycle which constitutes a closed cycle for circulating a refrigerant therein and includes two series-connected compressors including at least one variable capacity compressor, an outdoor heat exchanger, an expansion valve, and an indoor heat exchanger, said indoor heat exchanger being provided with a room temperature sensor and an indoor fan;

a floor heating panel connected in a bypass circuit, said bypass circuit being formed between a low-pressure discharge portion of said two-series connected compressors in the refrigeration cycle and said expansion valve, and said floor heating panel being provided with a floor temperature sensor;

a flow control valve arranged in a refrigerant upstream side of said floor heating panel at the heating operation;

control means for (A) controlling said two compressors, said indoor fan, and said flow control valve in a predetermined drive state at a start of a heating operation, to simultaneously start air heating by said indoor heat exchanger and floor heating by said floor heating panel;

(B) controlling said two compressors, said indoor fan, and said flow control valve in a second predetermined drive state when a detection output from said room temperature sensor reaches a preset value, to maintain a room temperature by said air heating and increase a floor temperature by said floor heating;

(C) controlling at least one of said two compressors and said flow control valve in a third predetermined drive state when a detection output from said floor temperature sensor reaches a preset valve, to maintain the floor temperature by said floor heating; and (D) controlling at least one of said two compressors and said indoor fan in a fourth predetermined drive state, to control the room temperature to a predetermined value by said air heating.

11. An apparatus according to claim 10, further including:

a second expansion value arranged in said bypass circuit on a refrigerant downstream side of said floor heating panel at the heating operation; and a solenoid valve arranged in said bypass circuit on a refrigerant downstream side of said second expansion valve at the heating operation.

12. An apparatus according to claim 10, wherein said control means includes means for controlling the degree of opening of said flow control valve and the amount of air of said indoor fan in the first to fourth predetermined drive states in accordance with outputs from said room temperature sensor and said floor temperature sensor, and an inverter for controlling said variable capacity compressor in accordance with an output from said controller.

13. An apparatus according to claim 10, wherein said two compressors include a two-stage compression type variable capacity compressor, having two cylinders connected in series with each other, for performing compression in low and high pressure stages.

14. An apparatus according to claim 10, wherein said two compressors comprise a variable capacity compressor and a fixed capacity compressor.

15. An apparatus according to claim 14, wherein said fixed capacity compressor constitutes a low pressure stage, and said variable capacity compressor constitutes a high pressure stage.

* * * * *